March 10, 1931. E. C. EPPLE 1,795,849
ICE CREAM DISPENSING CAN
Filed Dec. 10, 1928
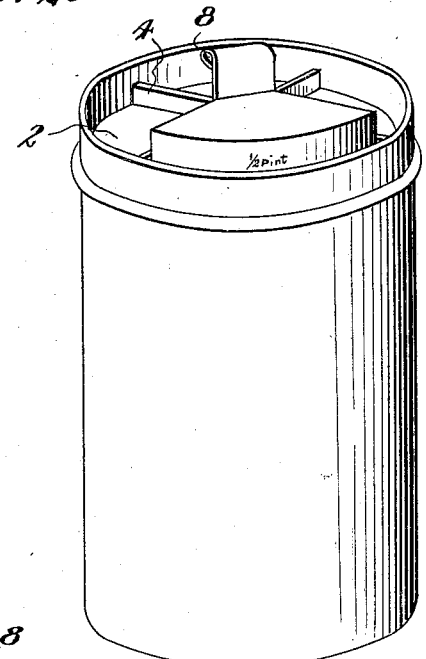
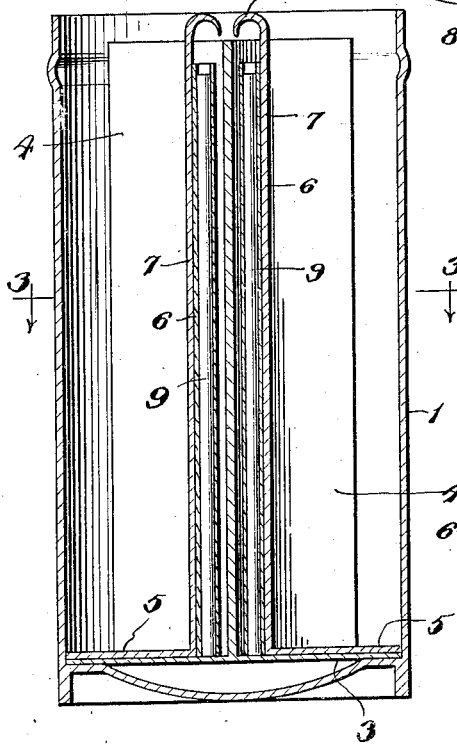
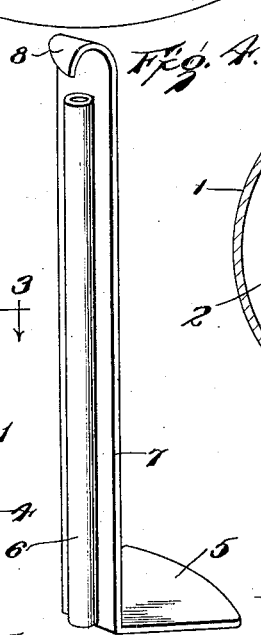
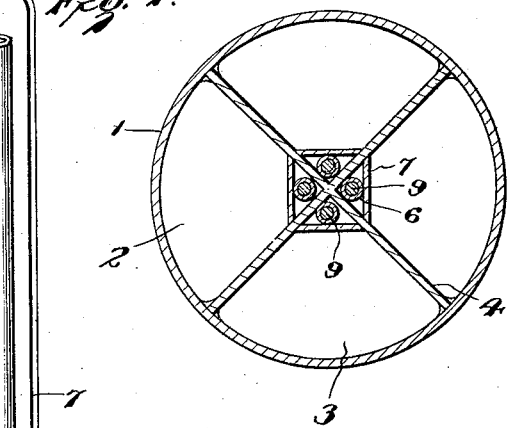
Inventor
E. C. Epple
By Lacey & Lacey, Attorneys Patented Mar. 10, 1931

1,795,849

UNITED STATES PATENT OFFICE

ELMER C. EPPLE, OF MARIETTA, OHIO

ICE-CREAM-DISPENSING CAN

Application filed December 10, 1928. Serial No. 325,020.

The invention relates to the dispensation of ice cream and analogous frozen delicacies in determinate quantity, half pint, pint, quart, etc., and obviates the accustomed handling by the retailer which materially destroys the light texture thereof as received from the manufacturer.

In accordance with the invention the usual can holding the cream to be dispensed is divided vertically into a plurality of compartments, and a lifter is located in each of the compartments. The cream is molded into blocks corresponding in shape with the compartments of the can, and the blocks are wrapped and placed in the compartments, the wrappers being marked to indicate half pints, or other measured quantity. To obtain the cream the block is partly withdrawn to enable the desired quantity to be cut therefrom. The lifter provides convenient means for elevating the block and again lowering it into the can after the required amount has been cut therefrom.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which:—

Figure 1 is a perspective view of an ice cream can illustrating an embodiment of the invention, the cover being omitted and one of the blocks of cream being elevated.

Figure 2 is a vertical, central sectional view of the can and attachment.

Figure 3 is a horizontal sectional view on the line 3—3 of Figure 2.

Figure 4 is a perspective view of one of the lifters.

Corresponding and like parts are referred to in the following description and designated in the several views of the drawing by like reference characters.

The numeral 1 designates a can such as usually employed for holding ice cream and analogous frozen delicacies.

The present invention contemplates a divider of a size to fit within the can and subdivide it into a plurality of compartments 2, each adapted to receive a block of ice cream. The divider comprises a plate 3 and a plurality of radially disposed partitions 4 which are attached at their lower ends to the plate 3 and to one another along their inner vertical edges. The partitions 4 are regularly spaced to provide compartments 2 of uniform size. The divider fits snugly within the can 1, yet is readily removable therefrom for cleaning. The arrangement admits of a single can holding ice cream of different flavors or different delicacies. The ice cream or analogous frozen delicacy is molded into the shape of a block corresponding with the formation of the compartment 2 and is wrapped in paraffin paper, the block fitting loosely in a compartment so as to be easily lifted and lowered. The wrapper is marked to denote quantity such as a half pint, a pint, etc. To admit of the block being readily elevated or withdrawn from the compartment each is supplied with a lifter which includes a foot 5 and a stem, the latter consisting of a guide 6 and a guard 7. A finger piece 8 is provided at the top of the stem and consists of an extension of the guard 7 bent into the form of a hook. The guide 6 consists of a tube which is slidable on a rod 9 projecting vertically from the plate 3. The rods 9 are located in the angles formed between adjacent partitions 4 and the guards 7 are of a width to extend across the angles in front of the rods thereby preventing the contents of the compartments from wedging into the angular spaces. The attachment is of a size to obtain a snug fit within the can for which it is designed.

The attachment may be of a nature to divide the can into any required number of compartments, four being shown, and the lifters will be of a shape corresponding to the outline of the compartments. In practice the divider is slipped into the can 1, and the cream after being molded and wrapped, is placed upon a lifter and lowered into a compartment. When the can is filled each of the compartments holds a wrapped block of cream or other frozen delicacy. To dispense a half pint or other required quantity the block is lifted a distance to admit of the desired amount being readily cut therefrom.

The portion cut from the block is suitably wrapped and handed to the customer. The block is lowered in the compartment until again required to be elevated to obtain another portion, when the operation just described is repeated.

Having thus described the invention, I claim:—

1. The combination with an ice cream can, and radially disposed partitions therein subdividing the same into vertical compartments, rods disposed in the angular spaces formed between adjacent partitions, and a lifter comprising a foot and a stem, the later including a guide to coact with one of the said rods and a guard extending across the angular space formed between adjacent partitions and disposed forwardly of the guide and cooperating rod.

2. The combination with an ice cream can, of a divider readily removable therefrom and comprising a plate, radially disposed partitions connected to the plate and rods disposed in the angular space formed between adjacent partitions, of a lifter for each compartment comprising a foot and a stem, the latter including a guide and a guard, the latter projecting and bent to provide a finger piece.

3. The combination with a divider to be removably fitted in a can to form article receiving compartments, the same comprising a plate, radial partitions on the plate, and guide elements in the angles formed between adjacent partitions, of a lifter for each of the article receiving compartments including a foot, a guide at one side of the foot to coact with a guide element of the divider, and a guard adjacent the guide to protect it and extend across the angular space formed between adjacent partitions of the divider.

In testimony whereof I affix my signature.

ELMER C. EPPLE. [L. S.]